US008428542B2

(12) United States Patent
Bornazyan

(10) Patent No.: US 8,428,542 B2
(45) Date of Patent: Apr. 23, 2013

(54) ADAPTIVE CANCELLATION OF MULTI-PATH INTERFERENCES

(75) Inventor: Gevork George Bornazyan, Sun Valley, CA (US)

(73) Assignee: Exelis, Inc., McLean, VA (US)

(\*) Notice: Subject to any disclaimer, the term of this patent is extended or adjusted under 35 U.S.C. 154(b) by 361 days.

(21) Appl. No.: 12/803,455

(22) Filed: Jun. 28, 2010

(65) Prior Publication Data

US 2011/0319044 A1 Dec. 29, 2011

(51) Int. Cl.
*H04B 1/10* (2006.01)
(52) U.S. Cl.
USPC ........................................ 455/296; 455/278.1
(58) Field of Classification Search .................. 455/296, 455/233.1, 232.1, 278.1, 84, 276.1, 303–304, 455/67.13, 67.16, 226.1; 375/346
See application file for complete search history.

(56) References Cited

U.S. PATENT DOCUMENTS

| | | | | |
|---|---|---|---|---|
| 5,125,108 A | * | 6/1992 | Talwar | 455/278.1 |
| 5,428,831 A | * | 6/1995 | Monzello et al. | 455/296 |
| 5,548,838 A | * | 8/1996 | Talwar et al. | 455/296 |
| 5,584,065 A | * | 12/1996 | Monzello | 455/278.1 |
| 2010/0220824 A1 | * | 9/2010 | Guess et al. | 375/346 |

\* cited by examiner

*Primary Examiner* — Lana N Le

(57) ABSTRACT

A multi-path signal interference cancellation system cancels multiple time delayed signal components of a multi-path interference signal received by a receive antenna and carried on a receiver transmission line of a radio receiver system. The interference cancellation system includes a plurality of adaptive interference canceller circuits, each of which has a synchronous detector, a signal controller and an integrator as essential parts of closed control loops defined by the canceller circuits. The integrator has gain and bandwidth characteristics associated therewith which are adjustable to adjust the gain and bandwidth of each closed control loop. An intensity profile of the multi-path interference signal is generated and stored in a memory. An intensity profile signal from the memory is provided to the integrator of each adaptive interference canceller circuit to adjust the gain and bandwidth of the integrator and the loop in which it is situated to maximize the error detection residual signal-to-noise ratio of each adaptive interference canceller circuit. Each adaptive interference canceller circuit generates a cancellation signal from which a synthesized cancellation signal is generated and effectively injected onto the receiver transmission line to cancel the multiple time delayed signal components of the multi-path interference signal carried thereon so that the radio receiver of the radio receiver system only receives a desired signal.

3 Claims, 5 Drawing Sheets

ADAPTIVE CANCELLATION OF MULTI-PATH INTERFERENCES

BACKGROUND OF THE INVENTION

1. Field of the Invention

The present invention relates to interference cancellation systems and methods, and more particularly relates to interference cancellation systems and methods for minimizing or eliminating interference in radio receivers due to unwanted signals. Even more specifically, this invention relates to an interference cancellation system and method for minimizing an interfering signal which arrives at different times at the radio receiver through multi-paths due to reflections or the like.

2. Description of the Prior Art

An adaptive interference cancellation system cancels interferences in a receive line by employing synchronous detectors, such as vector demodulators, signal controllers, such as vector modulators, and integrators, as the central elements of a closed control loop within the cancellation system that require no a priori knowledge of the interference signal characteristics, leaving the desired signal almost unaffected at the receive line.

FIG. 1 of the drawings illustrates a conventional adaptive interference cancellation system connected to a radio receiver system. The radio receiver system basically includes a receiver antenna 2, a receiver 4 and a receiver transmission line 6 interconnecting the receiver antenna 2 and the receiver 4. The receiver antenna 2 may be viewed as receiving both an interfering signal and a desired signal.

The interference cancellation system is designed to cancel the interfering signal from the receiver path defined by the receiver antenna 2, the receiver 4 and the receiver transmission line 6. The interference cancellation system accepts an RF sample of the interfering signal with the help of an auxiliary or reference antenna 8. This reference signal is used to detect the presence, amplitude and phase of this same signal in the receiver path or transmission line 6 between the receiver antenna 2 and the receiver 4.

A directional coupler 10 is electrically coupled to the receiver transmission line 6 to "tap" the receiver transmission line and provide a sample signal (also known as residual error sample). A portion of the reference signal is provided to one input port of a synchronous detector 12 using a directional coupler 14 which is electrically coupled to the auxiliary antenna 8. The other input of the synchronous detector 12 is provided with the sample signal from the directional coupler 10 of the receiver path.

The synchronous detector 12 compares the reference signal with the sample signal, and provides detector output signals which vary in accordance with the differences in amplitude and phase between the reference signal and the sample signal. The synchronous detector is generally a quadrature phase detector having two outputs, Q and I.

Each of the detector output signals may be provided to an integrator/amplifier 16, which will provide time varying, DC control signals which vary in response to the detector output signals. These control signals are provided to a signal controller 18.

The signal controller 18 receives the reference signal through an output of the directional coupler 14 and adjusts the amplitude and phase of the reference signal in response to the control signals it receives from the synchronous detector 12 (via the integrator/amplifier 16). An amplifier 20 may be positioned between the directional coupler 14 and the signal controller 18 to amplify that portion of the reference signal which passes through the directional coupler.

The signal controller 18 provides a cancellation signal which is injected into the receiver path using a subtractor 22 with equal amplitude but in a phase opposite to that of the interfering signal, thereby cancelling the interfering signal from the receiver path.

A problem with the conventional adaptive interference cancellation system shown in FIG. 1 is when the interference signal follows multiple paths, which can occur due to multiple reflections or the like. The interference signal is received by the radio receiver after multiple time delays and generally in different strengths due to the multiple paths that it follows. In such a case, the depth of cancellation of interference achieved in the conventional adaptive interference cancellation system can be greatly degraded, since no single delay line cancellation system can approximate multi-path effects.

Improved depth of cancellation of interference, arriving from its source to a receiving antenna through several propagation multi-paths, can be achieved by employing a multiple interference cancellation system, which employs a number of adaptive cancellers, the number being kept at the optimum by approximating two or more propagation paths to their single equivalent paths. The optimum number of approximated paths and consequently the number of adaptive cancellers are determined by the time spread over which the multi-path interference occurs, and the tap spacing (delay) that is required to achieve a desired depth of cancellation.

FIG. 2 is a block diagram which shows an arrangement of a conventional multi-path interference cancellation system 30 that employs several adaptive cancellers 32 with different time delays (effected by delay lines 34) at the reference paths of the cancellers. Letter "n" in the subscripts of the block diagram shown in FIG. 2 corresponds to the optimum number of approximated propagation paths, which is, conversely, consistent with the number of cancellers 32 in the system. The interference signal emanating from a source 33 takes multiple, time delayed paths ("1", "2", ... "n−1", "n") 35 to the receive antenna 54 of the radio receiver system.

As shown in FIG. 2, the conventional adaptive multi-path interference cancellation system 30 includes a plurality of adaptive cancellers 32, each having a synchronous detector 36, integrators 38 having a fixed gain and bandwidth coupled to the outputs of the synchronous detectors 36, and a signal controller 40 coupled to the output of the integrators 38 as part of closed control loops each having a fixed gain and bandwidth. The interference signal which is received by the reference antenna 42 is divided, and the divided signals are provided to the various reference signal paths of the adaptive cancellers 32. Alternatively, and as shown in FIG. 2, directional couplers 44 or dividers 46 may be used which are electrically coupled to a transmission line 43 electrically coupled to the reference antenna 42 to provide a reference signal. The reference signals, either from the divider 46 or the directional couplers 44, are provided to the signal controller 40 of each adaptive canceller 32 through an adjustable delay line 34. Each delay line 34 is optimized to adjust for a corresponding delay in a single equivalent propagation path which approximates two or more propagation paths which the interference signal takes.

An error sample signal is extracted from the receiver transmission line 52 between a subtractor 50 and the radio receiver 56 using a directional coupler 58, signal splitter or the like. The error sample signal on the output of the directional coupler 58 is provided to the input of a splitter or divider 60, on whose outputs are provided multiple versions ("Error_1[A(T1)]", "Error_2 [A(T2)]", . . . "Error_n−1 [A(Tn−1)]", "Error_n [A(Tn)]" of the error sample signal. These multiple error sample signals are provided to inputs of the synchronous detectors 36 of the adaptive cancellers 32.

The signal controller 40 of each adaptive canceller 32 provides a cancellation signal ("Cancelling_1", "Cancelling_2"..., "Cancelling_n–1", "Cancelling_n"), which cancellation signals are summed together using a combiner 48 to provide a combined cancellation signal coherent with the approximated characteristics of the multi-path interference ("Synthesized Cancelling Waveform"). This combined cancellation signal is provided to a signal subtractor 50, such as a 180° hybrid, to inject the combined cancellation signal into the received signal path (i.e., the transmission line 52 connected to the receive antenna 54) of the radio receiver system to cancel or at least minimize the multiple interference signal components of the received signal received by the receive antenna 54, leaving the desired signal received by the radio receiver 56 substantially free of the unwanted multi-path interference signal.

While the conventional adaptive multi-path interference cancellation system 30 shown in FIG. 2 adaptively accommodates attenuation and time delay, the same as those of the interference propagation paths, it does not take advantage of the time-varying trends of multi-path interferences, as will be explained in greater detail.

OBJECTS AND SUMMARY OF THE INVENTION

It is an object of the present invention to provide an interference cancellation system which is adapted to minimize or eliminate unwanted signals arriving at a radio receiver through multiple propagation paths.

It is another object of the present invention to provide a method for cancelling multi-path interference signals.

It is yet a further object of the present invention to provide an interference cancellation system and method which enhance the degree of adaptive cancellation of multi-path interferences by creating a time-delay domain, gain-bandwidth profile within the cancellation closed loop responses of multiple canceller systems that are coherent with the time-delay domain intensity trends of the interference propagation paths of the interference signal to the receiving antenna.

It is yet a further object of the present invention to provide a system and method for cancelling multi-path interference signals which provide improved interference cancellation in the receive line of a radio receiver.

It is still a further object of the present invention to provide an adaptive interference cancellation system and method for cancelling multi-path interference signals which employ adaptive cancellers providing closed loop controls which may be implemented in analog, digital or software forms, or in any combination thereof.

It is still a further object of the present invention to provide an adaptive interference cancellation system and method for cancelling multi-path interference signals which overcome the inherent disadvantages of known interference cancellation systems and methods.

In accordance with one form of the present invention, an interference cancellation system and method take advantage of the time-delay domain intensity trends of the interference propagation paths of the multi-path interference signal and replicate them in the closed loop responses of each adaptive canceller of the interference cancellation system by optimizing the gain-bandwidth characteristics of each loop coherently with such trends and, by doing so, the error detection residual interference-to-noise ratio for each closed loop control of an adaptive canceller is optimized independently from the closed loop control of the other adaptive cancellers.

More specifically, a multi-path signal interference cancellation system formed in accordance with the present invention cancels multiple time delayed signal components of a multi-path interference signal received by a receive antenna and carried on a receiver transmission line of a radio receiver system. The interference cancellation system includes a plurality of adaptive interference canceller circuits, each of which has a synchronous detector, a signal controller and an integrator which is adjustable in gain or bandwidth, or both, as essential parts of a closed control loop of the canceller circuit. Each loop has gain and bandwidth characteristics associated therewith which are adjustable. More specifically, the integrator preferably includes a programmable gain stage, such as a programmable amplifier or programmable attenuator, and has a programmable bandwidth (and integration) stage which is preceded by the programmable gain stage. An intensity profile of the multi-path interference signal is generated and stored in a memory. An intensity profile signal from the memory is provided to the programmable gain stage and programmable bandwidth stage which follows the gain stage of the integrator of each adaptive interference canceller circuit to adjust the gain and bandwidth of the closed loop to maximize the error detection residual signal-to-noise ratio of each adaptive interference canceller circuit. Each adaptive interference canceller circuit generates a cancellation signal from which a synthesized cancellation signal is generated and effectively injected onto the receiver transmission line to cancel the multiple time delayed signal components of the multi-path interference signal carried thereon so that the radio receiver of the radio receiver system only receives a desired signal.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 3:
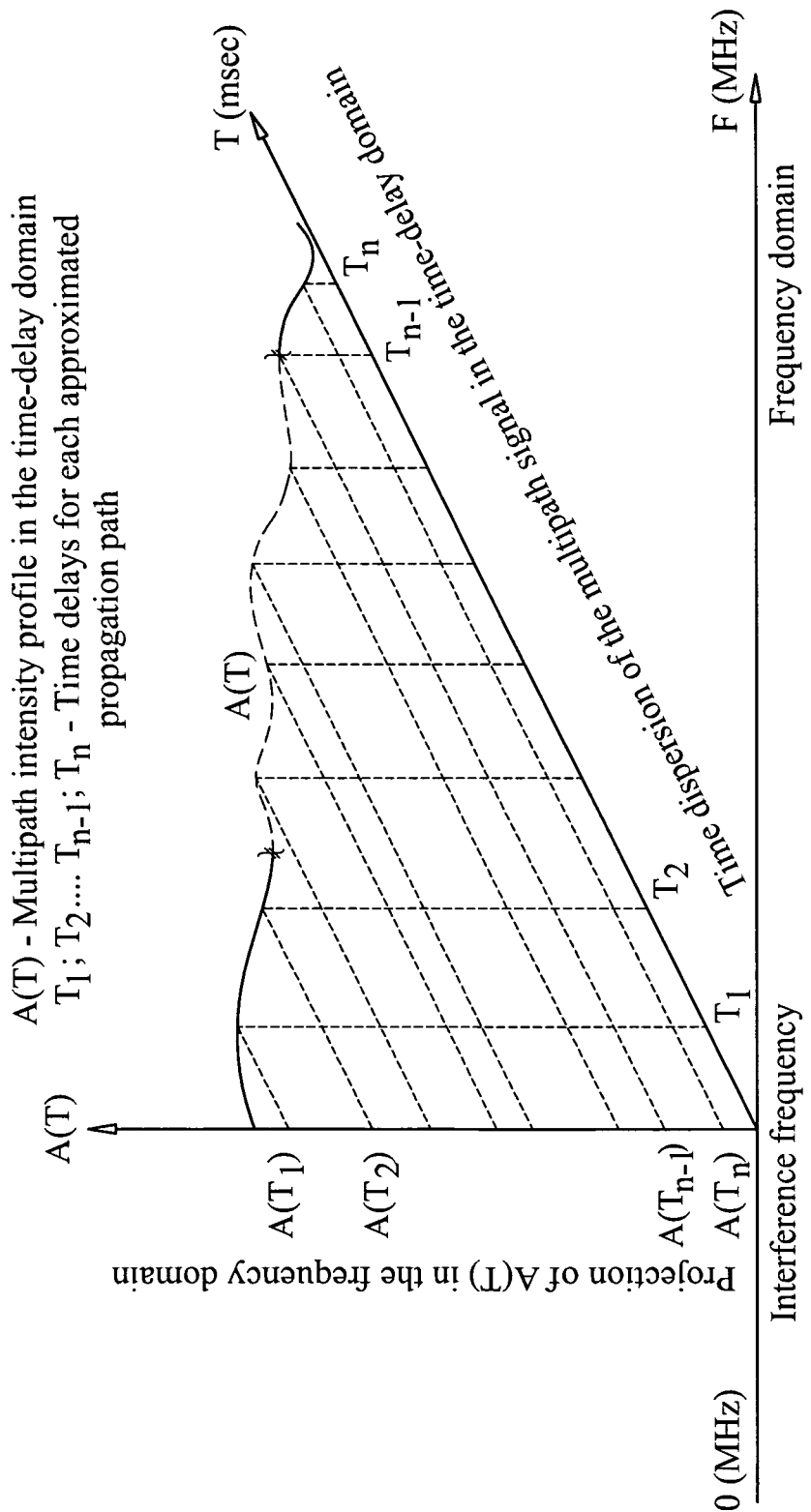
FIG. 3 is a generic three dimensional graph of a multi-path intensity profile of a multi-path interference signal in the time-delay (A(T); T plane) and frequency domains (A(T); F plane), as affected by multiple propagation paths.

In order to facilitate a full understanding of the invention, reference should first be made to FIG. 3 of the drawings, which is a three dimensional graph portraying a typical multi-path intensity profile A(T) of an interference signal in the time-delay and frequency domains as affected by the various propagation paths 35 which the interference signal takes. It should be noted that like reference numbers used herein and shown in the drawings refer to the same or similar components or items. An interference signal emanating from a source 33 may follow multiple paths 35 due to reflections caused by atmospheric conditions, buildings, structures or the like, to a receive antenna 54 of a radio receiver system. A typical time-spreading of the interference signal, arriving from its source to a receive antenna 54 through a number of propagation multi-paths 35 viewed in the time-delay and frequency domains, is depicted in FIG. 3. As can be seen from FIG. 3, the multi-path intensity (e.g., signal amplitude) profile A(T) of the interference signal, as affected by the propagation paths 35, has a very distinctive diminishing trend.

Figure 4:
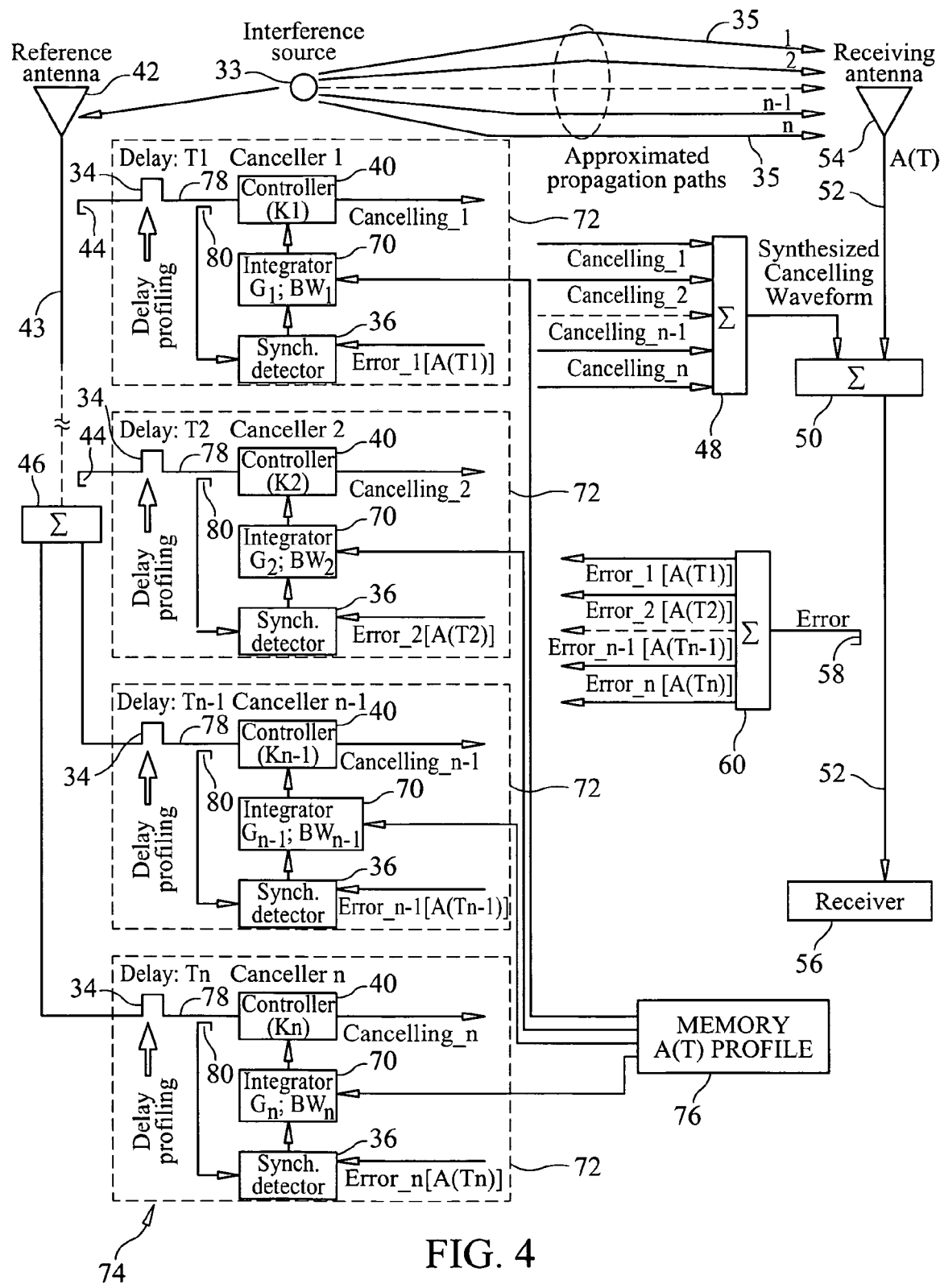
FIG. 4 is a block diagram of an adaptive multi-path interference cancellation system formed in accordance with the present invention.

More specifically, the amplitude of a multi-path signal for a given frequency tends to decrease with time, i.e., the multi-path components of the signal arriving later at the receive antenna 54 of a radio receiver system generally have a lower amplitude or intensity than the earlier-arriving components. In fact, this diminishing trend in the intensity of the multi-path signal oftentimes may be generally realized as a linear approximation, as shown in FIG. 3. Such intensity information, or amplitude profile, of the multi-path signal is used to adjust the gain and/or bandwidth of each closed control loop by adjusting a programmable bandwidth stage 71 and/or a programmable gain stage 69, such as a programmable amplifier or a programmable attenuator, preceding the programmable bandwidth stage 71 (which also performs integration), of an integrator 70 which is substituted for the fixed gain and bandwidth integrator 38 of the conventional adaptive interference cancellation system 30 shown in FIG. 2, in the individual adaptive cancellers 72 of the cancellation system 74 of the present invention, as shown in FIG. 4 of the drawings.

Figure 2:
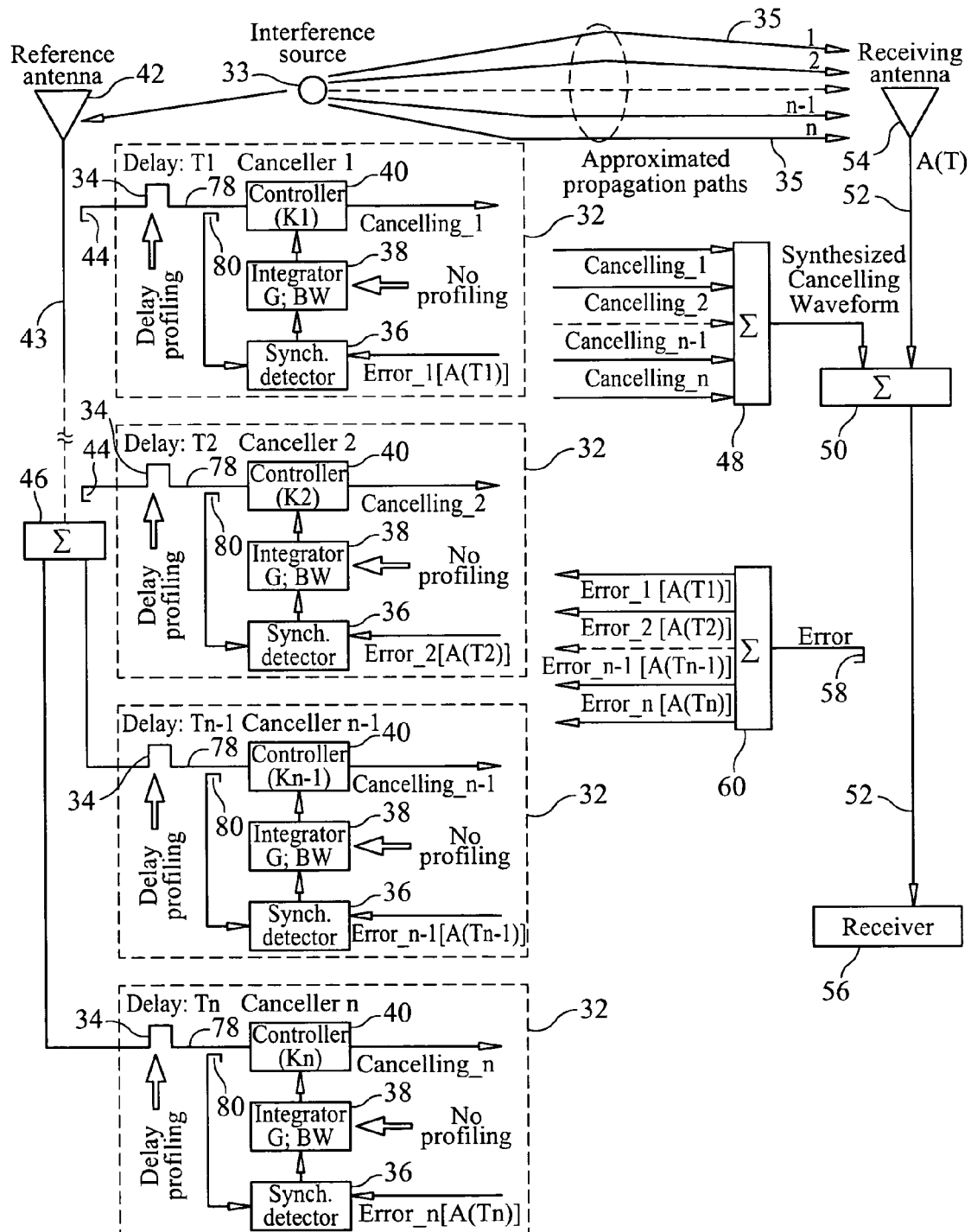
FIG. 2 is a block diagram of a conventional multi-path cancellation system that employs several adaptive cancellers with different time delays in the reference signal paths of the cancellers.

Conventionally, wideband cancellation of interference, arriving from its source at a receive antenna 54 through several propagation multi-paths 35, may be achieved by employing a multiple canceller system, such as shown in FIG. 2 of the drawings (repeated in FIG. 4), wherein the number of adaptive cancellers 32, 72 is kept at the optimum by approximating two or more propagation paths 35 to their single equivalent path, which will be equivalent to the multi-path environment of concern. The optimum number of approximated paths 35 and consequently cancellers 72 are determined by the time spread over which the multi-path interference occurs, and the tap spacing (delay) provided by the delay lines 34 that is required to achieve a desired depth of cancellation. This same determination is made with the interference cancellation system of the present invention shown in FIG. 4.

However, in the conventional multi-path signal interference cancellation system 30 shown in FIG. 2, only time delay profiling is used in cancelling each of the multi-path signal components. A delay line 34 is interposed between the output of each directional coupler 44 or splitter 46 coupled to the reference antenna 42 and the signal controller 40 and synchronous detector 36 of each adaptive canceller 32 ("Canceller 1", "Canceller 2" . . . "Canceller (n−1)", "Canceller n") forming part of the interference cancellation system 30. The time delay of each delay line 34 is chosen based on the expected time of arrival of a multi-path component of the interfering signal at the receive antenna 54 to provide time coincidence between the reference signal and the error sample signal provided to the synchronous detector 36, and the cancelling signal at the output of the signal controller 40 of each adaptive canceller 32 of the cancellation system 30 and the interfering signal at the receive antenna 54. But, the diminishing trend in the intensity of the multi-path signal over time (i.e., when it arrives at the receive antenna 54 of the radio receiver system), as illustrated by FIG. 3, is an important factor which is not taken into account in the conventional cancellation system 30 shown in FIG. 2, but is used in the cancellation system 74 of the present invention shown in FIG. 4 to adjust the gain and/or bandwidth of the closed control loops independently of one another. A signal corresponding to the multi-path signal intensity profile illustrated by FIG. 3 is provided to a control input of the programmable gain stage 69 and the programmable bandwidth stage 71 of each integrator 70 of the adaptive cancellers 72, thereby maximizing the error detection signal-to-noise ratio in each of the adaptive cancellers 72 of the system 74.

In other words, in a conventional multi-path signal interference cancellation system 30 such as shown in FIG. 2, the time delay of the signal is profiled and used by the adaptive cancellers 32 of the system. In the multi-path signal interference cancellation system 74 of the present invention, as shown in FIG. 4, not only is the time delay of the multi-path signal profiled but also the intensity trend of the signal is profiled as well.

For illustrative purposes, if one equates a multi-path signal as a pulse, then in time, due to multiple reflections, the radio receiver will receive the same signal at different times at the same frequency but in smaller intensities over time. In other words, the reflected signals would arrive at the receive antenna 54 at different times. The time aspect of the multi-path signal is mapped by the delay taps 34 of the adaptive cancellers 32, as shown in FIG. 2. But, prior to the present invention, the intensities or amplitudes of the multi-path signal over time have not been profiled and used in the cancellation of multi-path signals.

Stated another way, the adaptive multi-path interference cancellation system 74 of the present invention takes advantage of the distinctive trends of the interference multi-path intensity profile shown in FIG. 3 and replicates them in the closed loop responses of the multiple adaptive cancellers 72 of the system by optimizing gain-bandwidth characteristics of each loop that are coherent with the aforementioned trends, and by doing so, the system optimizes error detection signal-to-noise ratio for each closed control loop provided by each adaptive canceller 72 independently of the other adaptive cancellers of the system 74 and, thereby, mitigates the noise contribution of each adaptive canceller 72 into the cancelling process, resulting in improved interference cancellation in the receiver transmission line 52 of the radio receiver system.

In accordance with the present invention, the intensity profile of the multi-path signal is used to adjust the gain and/or the bandwidth of the closed control loop. More specifically, a signal corresponding to the intensity profile is used to adjust the gain of the programmable gain stage 69 and the bandwidth of the programmable bandwidth stage 71 of the integrators 70 in each adaptive canceller 72 of the system 74. Thus, for example, if the first delayed (T1) component of the multi-path signal received by the interference cancellation system 74 is relatively strong, then relatively little closed loop gain is needed to effectively detect the error signal, and the closed loop gain in the first adaptive canceller 72 ("Canceller 1") may be set to a minimal value. In the closed control loops, there is an inherent gain-bandwidth product that must be considered in most designs, which affects the stability of the loop. Following further with this consideration, the maximum possible gain and its corresponding bandwidth can be extracted from the loop of the first adaptive canceller 72 without disturbing the stability of the loop based on the intensity trend of the multi-path signal. This will allow achieving optimal error detection residual signal-to-noise ratio at the synchronous detector 72, which in turn will result in improved correlation between the first delayed (T1) component of the multi-path signal and the control signal provided to the signal controller 40.

Similarly, based on the intensity profile of the multi-path signal, the gain of the closed loop in each adaptive canceller 72 is adjusted to the maximum possible gain without disturbing the stability of the loop necessary to provide maximum correlation between the delayed component of the multi-path signal and the control signal provided to the signal controllers 40 to achieve maximum cancellation of the respective delayed component or reflected version of the multi-path signal. For the more delayed signals handled by the lower adaptive cancellers 72 ("lower" meaning with reference to FIG. 4) (i.e., "Canceller 2", . . . "Canceller (n−1)" and "Canceller n") of the cancellation system 74 respectively having delay taps T2, . . . Tn−1 and Tn, these signals will have a relatively lower intensity or amplitude. Therefore, in accordance with the intensity profile of the signal, each of the closed loops of the lower adaptive cancellers 72 has its gain increased correspondingly. However, in doing so, it may be necessary to decrease the bandwidth of the now higher gain loops in the lower adaptive cancellers 72 (with reference to FIG. 4) of the cancellation system 74 to maintain a gain-bandwidth product that achieves stable integrator and loop operation. By controlling the gain of the loops based on the intensity profile of the multi-path interference signal, the cancellation system 74 optimizes the error detection residual signal-to-noise ratio at each tap (i.e., for each adaptive loop) to detect the multi-path interference residual signal better. As a result of all of this, a cancellation signal may be generated more accurately to cancel (or at least minimize) the multi-path residual signal that is received at a particular time by the receive antenna 54 of the radio receiver system.

An interference cancellation system 30, 74 is usually designed for operation in a particular multi-path environment. For example, a cancellation system designed for use with a given type of aircraft is particularly adapted to cancel or minimize multi-path signals caused by reflections from the forward wings, aft wings, tail of the aircraft, loads or the like. The time when each reflected signal is received by the receive antenna 54 is profiled, and the taps for each adaptive canceller loop of the system are set up accordingly with particular time delays in the delay lines 34 (i.e., Delay T1, Delay T2 . . . Delay Tn−1, Delay Tn). For a multi-path signal of a given amplitude and at a particular frequency, the amplitudes of the reflected signals received by the receive antenna 54 at their time of arrivals are also measured in accordance with the present invention to at least partially derive the intensity profile. Multi-path signals at different frequencies and amplitudes may be measured to more fully derive the intensity profile. This intensity profile is used by the cancellation system 74 of the present invention to adjust the gain and/or bandwidth of the closed control loops by programming the bandwidth stage 71 and the gain stage 69 preceding the bandwidth stage 71 of the integrators 70 in the adaptive cancellers 72 of the system with desired gain and bandwidth settings. This intensity profile may be pre-stored in a memory 76 or the like, such as an electrically erasable programmable read only memory (EEPROM), and referred to later during operation of the multi-path signal interference cancellation system 74.

It is also possible for the interference cancellation system 74 of the present invention to operate in a multi-path environment which changes over time. For example, if the interference cancellation system 74 is used on a vehicle, the multi-path environment in which the vehicle operates may be caused by reflections from buildings, geological formations, radio towers and other structures. Each time the vehicle moves, the radio receiver 56 mounted thereon may encounter a different multi-path environment.

Accordingly, the interference cancellation system 74 of the present invention can measure the multi-path environment essentially in real time to create a delay profile and intensity profile of multi-path signals. The delay profile is used to set the time delay in adjustable delay lines 34 for each adaptive canceller 72 in the cancellation system 74, and the intensity profile is used to set the gain and/or bandwidth of the integrators 70 in order to adjust the gain and/or bandwidth of each closed control loop of the adaptive cancellers 72 of the system. Each time the vehicle is re-positioned in a different multi-path environment, a new delay profile and intensity profile are determined, if necessary, and stored in the memory 76 of the cancellation system 74. Thus, the multi-path signal interference cancellation system 74 of the present invention is adaptive to the multi-path environments it encounters and can re-assess the environment and derive delay and intensity profiles essentially in real time.

Accordingly, and as shown in FIG. 4 of the drawings, a multi-path signal interference cancellation system 74 formed in accordance with the present invention is connected to a radio receiver system having a receive antenna 54, a receiver 56 and a receiver transmission line 52 electrically coupling the receive antenna 54 to the receiver 56. The receive antenna 54 receives multiple time delayed signal components of an interference signal emanating from an interference source 33 following multiple paths 35 to the receive antenna 54, as well as a desired signal. The desired signal and the interference signal propagate to the receive transmission line 52 interconnecting the receive antenna 54 with the receiver 56. A directional coupler 58 is electrically coupled to the receiver transmission line 52. The directional coupler 58 has an output and provides thereon an error sample signal corresponding to the interference signal and a desired signal received by the receive antenna 54. This error sample signal is provided to a splitter 60 or other device which splits the error signal into a plurality of error signal components ("Error_1 [A(T1)]", "Error_2 [A(T2)]" . . . "Error_n−1 [A(Tn−1)]", Error_n [A(Tn)]", which represent the sample of the time delayed signal components of the interference signal and the desired signal found on the receiver transmission line 52. These error sample signals are provided to respective synchronous detectors 36 of the adaptive canceller circuits 72 ("Canceller 1", "Canceller 2". . . "Canceller (n−1)", "Canceller n"), as shown in FIG. 4 of the drawings.

The multi-path interference signal cancellation system 74 of the present invention further includes a reference antenna 42 which receives the interference signal from the interference source 33. The reference antenna 42 provides a reference signal corresponding to the interference signal which it receives on a transmission line 43 or the like. A plurality of directional couplers 44 or splitters 46, each of which have outputs, are electrically coupled to the transmission line 43 connected to the reference antenna 42 and generate on their outputs signals representative of the reference signal from the reference antenna transmission line 43. These representative reference signals are provided to an input of the signal controller 40 of each adaptive canceller circuit 72 included in the multi-path signal interference cancellation system 74. As mentioned previously, each of these representative reference signals may pass through a delay line 34 or other delay circuit prior to being input to each signal controller 40. The delay lines 34 provide a predetermined delay ("T1", "T2", . . . "Tn−1", "Tn"), the time delays of each delay line 34 being set in accordance with delay profiling described previously.

Figure 1:
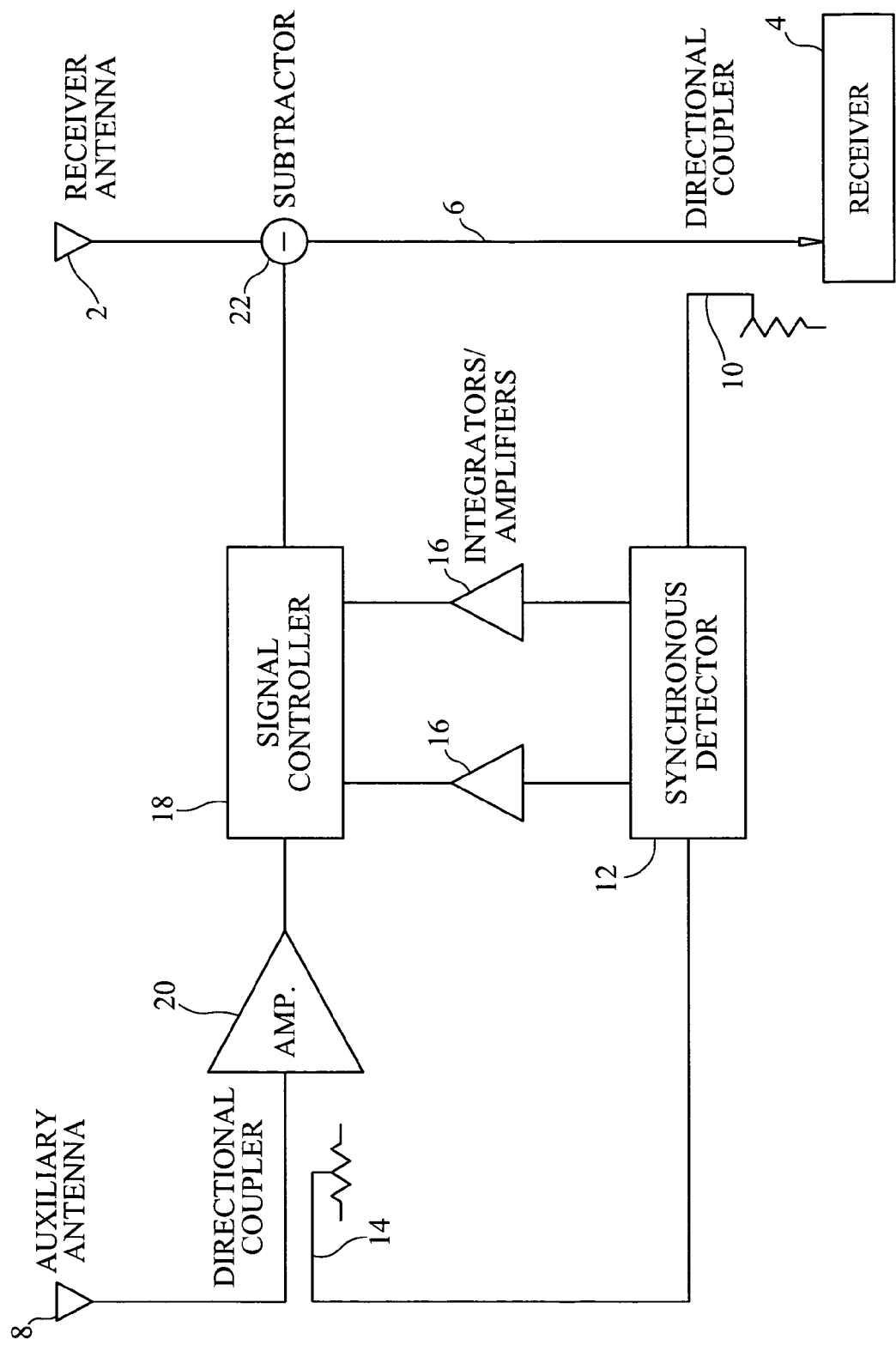
FIG. 1 is a block diagram of a conventional interference cancellation system.

Each adaptive canceller 72 ("Canceller 1", "Canceller 2", . . . "Canceller (n−1)", "Canceller n") of the multi-path signal interference cancellation system 74 includes a synchronous detector 36, a signal controller 40 and at least one integrator 70, as well as the delay line 34 mentioned previously. The synchronous detector 36 is generally a quadrature phase detector having two outputs, I and Q. Therefore, generally two integrators 70 would be used in the system (such as shown in FIG. 1), one integrator 70 for the I channel and the other integrator 70 for the Q channel, where each integrator 70 includes a programmable bandwidth stage 71 and a programmable gain stage 69 preceding the programmable bandwidth stage 71.

The synchronous detector 36 of each adaptive canceller circuit 72 has a first input which receives an error sample signal ("Error_1 [A(T1)]", "Error_2 [A(T2)]", . . . "Error_n−1 [A(Tn−1)]", Error_n [A(Tn)]") from the splitter 60 and a second input which receives the time delayed representative reference signal that passes through the delay line 34 and which is provided on a transmission line 78 or the like coupling the delay line 34 to the signal controller 40, using a directional coupler 80 or the like electrically coupled to this transmission line 78, whose output is electrically coupled to the second input of the synchronous detector 36. The synchronous detector 36 of each adaptive interference canceller circuit 72 is responsive to the error sample signal and the representative reference signal provided to the synchronous detector 36, and generates at least one detector output signal (but more preferably, two detector output signals for the I and Q channels) in response to the representative reference signal and the error signal provided to the synchronous detector 36.

The at least one integrator 70 of each adaptive interference canceller circuit 72 has gain and bandwidth characteristics ("$G_1$; $BW_1$", "$G_2$; $BW_2$" . . . "$G_{n-1}$; $BW_{n-1}$", "$G_n$; $BW_n$") associated therewith. Each integrator 70 has a first input which receives the at least one detector signal from the synchronous detector 36 and a second input which receives an intensity profile signal. The intensity profile signal is generated by a storage circuit or memory 76, which stores an intensity profile of the multi-path interference signal, and generates the intensity profile signal in a response thereto. In response to the intensity profile signal it receives, the integrator 70 generates an integrator output signal that is adjusted in at least one of gain and bandwidth in response to the at least one detector signal and the intensity profile signal.

The signal controller 40 of each adaptive interference canceller circuit 72 includes at least a first input on which is provided the integrator output signal, and a second input on which is provided the delayed representative reference signal from a respective delay line 34. The signal controller 40 of each adaptive interference canceller circuit 72 generates in response to the integrator output signal and the delayed representative reference signal a cancellation signal ("Cancelling_1", "Cancelling_2", . . . "Cancelling_n−1", "Cancelling_n") on its output, which cancellation signals are provided to the inputs of a summer or combiner 48, which generates on its output a synthesized cancellation signal ("Synthesized Cancelling Waveform" shown in FIG. 4). The synthesized cancellation signal is provided to one input of a subtractor 50 (or adder) electrically coupled to the output of the combiner 48. A second input of the subtractor 50 (or adder) is coupled to the receiver transmission line 52. The subtractor 50 (or adder) thus receives the synthesized cancellation signal, the desired signal and the multiple time delayed signal components of the interference signal received by the receive antenna 54. Thus, the synthesized cancellation signal is made up of the various cancellation signals generated by the adaptive interference canceller circuits 72 ("Canceller 1", "Canceller 2", . . . "Canceller (n−1)", "Canceller n"), and such cancellation signals are effectively injected onto the receiver transmission line 52. Each cancellation signal making up the synthesized cancellation signal injected by the subtractor 50 (or adder) onto the receiver transmission line 52 is substantially equal in amplitude and substantially opposite in phase to each of the multiple time delayed components of the interference signal received by the receive antenna 54 and found on the receiver transmission line 52 so as to cancel or at least minimize the multiple time delayed components of the interference signal before they are received by the radio receiver 56. Therefore, the output of the subtractor 50 (or adder), which is connected to the portion of the receiver transmission line 52 provided to the radio receiver 56, should be free of the multi-path interference signal so that only the desired signal is received by the radio receiver 56.

Thus, in accordance with the present invention, a method of cancelling a multi-path interference signal having multiple time delayed signal components which is received by a receive antenna 54 and receiver transmission line 52 connected thereto of a radio receiver system, includes the steps of generating an intensity profile of the multi-path interference signal, and generating cancellation signals from a plurality of adaptive interference canceller circuits 72. Each adaptive interference canceller 72 circuit has a synchronous detector 36 generating at least one detector output signal, at least one integrator 70 responsive to the at least one detector output signal and generating an integrator output signal, and a signal controller 40 generating one of the cancellation signals in response to the integrator output signal. The at least one integrator 70 has gain and bandwidth characteristics associated therewith.

The method of cancelling the multi-path interference signal further includes the step of adjusting at least one of gain and bandwidth of the at least one integrator 70 based on the intensity profile. The method further includes the step of injecting onto the receiver transmission line 52 a synthesized cancellation signal corresponding to the cancellation signals generated by the signal controllers 40 of the adaptive interference canceller circuits 72. The synthesized cancellation signal injected onto the receiver transmission line 52 is substantially equal in amplitude and substantially opposite in phase to the multiple time delayed components of the multi-path interference signal received by the receive antenna 54 and carried on the receiver transmission line 52 to minimize or cancel the multiple time delayed components of the multi-path interference signal.

Figure 5:
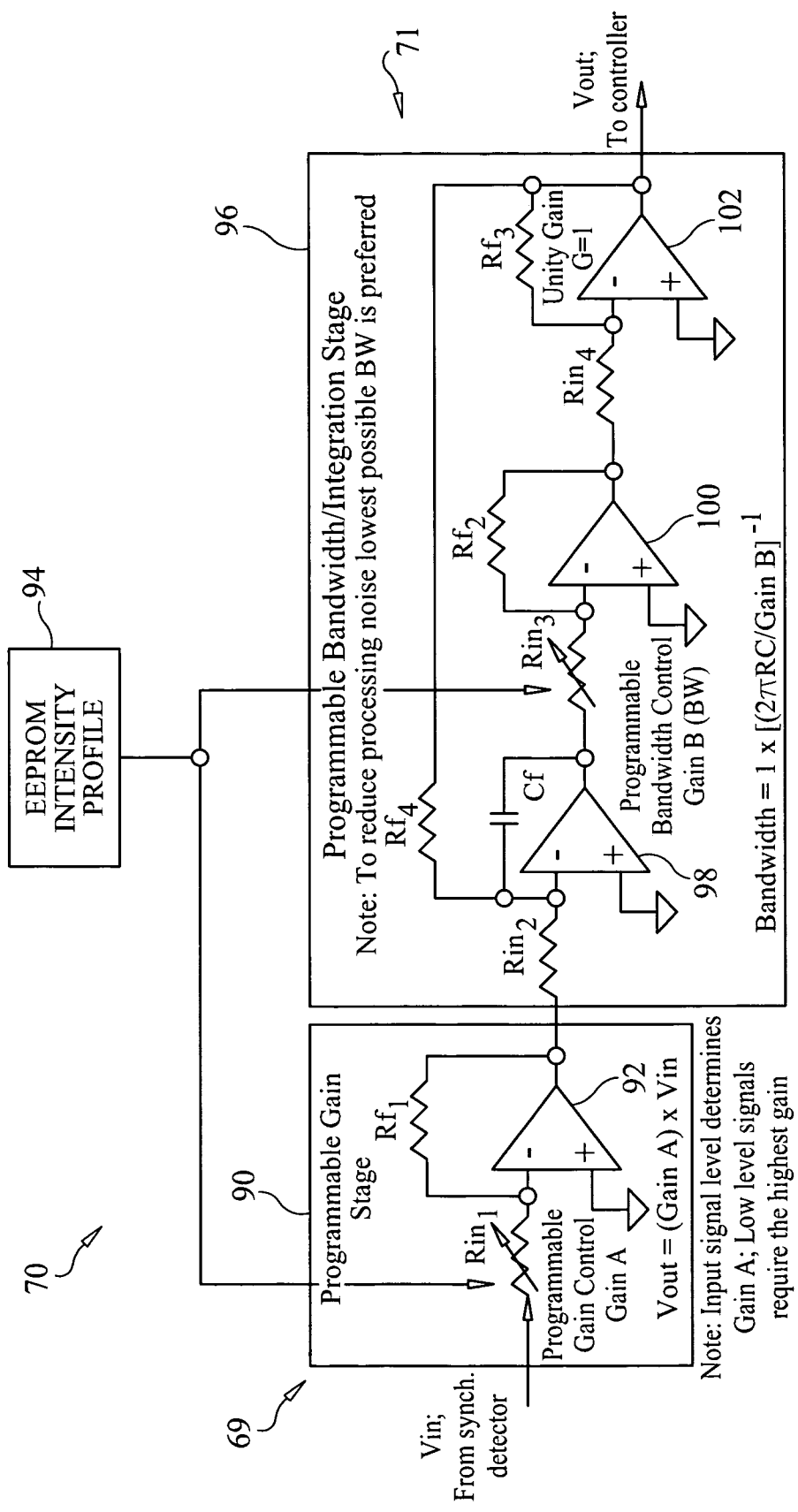
FIG. 5 is a block diagram of a preferred form of an analog variable gain-bandwidth integrator used in each adaptive canceller of the adaptive multi-path interference cancellation system of the present invention.

FIG. 5 is a block diagram of an analog form of a variable gain-bandwidth integrator 70 constructed in accordance with the present invention for use in each adaptive canceller 72 of the multi-path signal interference cancellation system 74 of the present invention. As stated previously, it should be noted that there are generally two integrators 70 used in each adaptive canceller 72 between the synchronous detector 36 and the signal controller 40, one integrator being used for the I channel and the other integrator being used for the Q channel. Since each of the I and Q integrators is essentially structurally the same, only one integrator will be described below.

In the preferred form of the analog implementation of the integrator 70 shown in FIG. 5, an analog voltage signal Vin generated by the synchronous detector 36 for either the I or Q channel is provided to the input of a programmable gain circuit 90 forming the first section of the integrator 70. The programmable gain circuit 90 is exemplified herein as an operational amplifier 92 having feedback resistor $Rf_1$ connected between the output and inverting input of the operational amplifier 92, and an adjustable (programmable) input resistor $Rin_1$ connected at one end to the inverting input and to which the signal Vin is applied at the other end. The non-inverting input of the operational amplifier 92 is grounded. The output voltage signal of the programmable gain circuit is equal to the gain of the amplifier multiplied by the input voltage signal applied to the circuit. The gain (Gain A) of the circuit is approximately equal to $-(Rf_1/Rin_1)$.

The adjustable resistor $Rin_1$ may be in the form of a programmable digital attenuator. Multi-path signal intensity information is stored in a digital format in an EEPROM 94. The output of the EEPROM 94 is connected to the programmable attenuator used in the circuit 90 for input resistor $Rin_1$, so that the gain of the integrator 70 may be adjusted in accordance with the intensity profile of the multi-path interference signal stored in the memory 94.

The output signal from the programmable gain circuit 90 defining the first section of the analog integrator 70 is provided to a programmable bandwidth/integration circuit 96 forming a second section of the integrator 70, as shown in FIG. 5. Here, the programmable bandwidth/integration circuit 96 includes as a first stage an operational amplifier 98 configured as a low pass filter circuit with a feedback capacitor Cf connected between the output and inverting input of the operational amplifier 98, and an input resistor Rim connected at one end to the inverting input of the operational amplifier 98 and at whose other end is provided the output voltage signal from the programmable gain circuit 90 of the first section. The non-inverting input of the operational amplifier 98 for this first stage is grounded.

The output voltage signal of the first stage filter circuit is provided to a second stage operational amplifier circuit configured in the same manner as the programmable gain circuit 90 of the first section described previously and having an operational amplifier 100, a feedback resister $Rf_2$ and an adjustable (programmable) input resistor $Rin_3$ to which is provided the filtered output voltage signal from the first stage of the programmable bandwidth/integration circuit 96. The adjustable resistor $Rin_3$ is operatively connected to the output of the EEPROM 94 or other memory having the intensity profile of the multi-path signal stored therein, in the same manner as previously described with respect to the programmable gain circuit 90 of the first section. This second stage amplifier circuit thus provides the programmable bandwidth/integration section of the analog integrator 70 with a desired adjustable gain B.

The voltage output signal of the second stage amplifier of the programmable bandwidth/integration circuit 96 of the second section is preferably provided to a third stage defined by a unity gain amplifier circuit having an operational amplifier 102 configured as a unity gain or buffer amplifier 102 by feedback resistor $Rf_3$ connected between the output and inverting input of the operational amplifier, and an input resistor $Rin_4$, equal in value to feedback resistor $Rf_3$ to provide the third stage amplifier circuit with unity gain, input resistor $Rin_4$ being connected at one end to the inverting input of the operational amplifier 102 and on the other end of which is applied the output voltage signal of the second stage amplifier circuit. The non-inverting input of the third stage operational amplifier 102 is grounded. The output voltage signal of the unity gain buffer amplifier circuit is provided to one input (the I or Q input) of the signal controller 40, and is also provided to the inverting input of the first stage operational amplifier 98 through feedback resistor $Rf_4$ to be summed with the output voltage signal provided by the first stage filter circuit. The bandwidth of the analog integrator 70 shown in FIG. 5 is shown in equation 1 below:

$$\text{Bandwidth} = 1 \times [2 \times \pi \times Rf_4 \times Cf/\text{Gain } B]^{-1} \quad \text{Equation 1}$$

where the Gain B is approximately equal to $-(Rf_2/Rin_3)$.

Resistor $Rin_a$ is programmable, and thus determines the bandwidth (through Gain B) of the integrator 70 in accordance with the intensity profile of the multi-path signal stored in the memory 94.

Of course, it is envisioned to be within the scope of the present invention to form a digital or software version of an integrator 70 having its gain and/or bandwidth adjustably controlled by the intensity profile of the multi-path signal.

The multi-path signal interference cancellation system 74 of the present invention enhances the degree of adaptive cancellation of multi-path inference by creating an intensity profile of the multi-path signal and applying the profile to set the gain and/or bandwidth of the integrators 70 to thereby adjust the gain and/or bandwidth in the adaptive canceller loops forming part of the interference cancellation system. The gain-bandwidth characteristic of each loop is optimized, thus maximizing the error detection residual interference-to-noise ratio for each closed loop control of the adaptive cancellers independently from the closed loop control of other adaptive cancellers 72 in the system.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A multi-path signal interference cancellation system for connection to a radio receiver system having a receive antenna, a receiver and a receiver transmission line electrically coupling the receive antenna to the receiver, the receive antenna receiving multiple time delayed signal components of an interference signal following multiple paths to the receive antenna, which comprises:

a reference antenna, the reference antenna receiving the interference signal and providing a reference signal corresponding thereto;

a coupler, the coupler being electrically coupled to the receiver transmission line and providing an error sample signal;

a storage circuit for storing an intensity profile of the multi-path interference signal and generating an intensity profile signal in response thereto;

a plurality of adaptive interference canceller circuits, each adaptive interference canceller circuit having a synchronous detector, a signal controller and at least one integrator, the synchronous detector of each adaptive interference canceller circuit receiving at least a portion of the reference signal and at least a portion of the error sample signal and generating at least one detector output signal in response thereto, the at least one integrator of each adaptive interference canceller circuit having gain and bandwidth characteristics associated therewith and being responsive to the at least one detector signal and the intensity profile signal and generating an integrator output signal adjusted in at least one of gain and bandwidth in response to the at least one detector signal and the intensity profile signal, the signal controller of each adaptive interference canceller circuit receiving at least a portion of the reference signal and the integrator output signal and generating in response thereto a cancellation signal;

a subtractor, the subtractor being electrically coupled to the receiver transmission line and effectively injecting the cancellation signal generated by each signal controller of each adaptive interference canceller circuit onto the receiver transmission line, the cancellation signals effectively injected onto the receiver transmission line being substantially equal in amplitude and substantially opposite in phase to the multiple time delayed components of the multi-path interference signal received by the receive antenna so as to minimize or cancel the multiple time delayed components of the multi-path interference signal.

2. A multi-path signal interference cancellation system as defined by claim 1, wherein each adaptive interference canceller circuit of the multi-path signal interference cancellation system includes a time delay circuit, the time delay circuit being responsive to at least a portion of the reference signal and providing a time delayed output signal, the synchronous detector and signal controller of each adaptive interference canceller circuit being at least partially responsive to the time delayed output signal and respectively generating the at least one detector output signal and cancellation signal in at least partial response thereto.

3. A method of cancelling a multi-path interference signal having multiple time delayed signal components which is received by a receive antenna and receiver transmission line connected thereto of a radio receiver system, which comprises the steps of:

generating an intensity profile of the multi-path interference signal;

generating cancellation signals from a plurality of adaptive interference canceller circuits, each adaptive interference canceller circuit having a synchronous detector generating at least one detector output signal, at least one integrator responsive to the at least one detector output signal and generating an integrator output signal, and a signal controller generating a respective one of the cancellation signals in response to the integrator output signal, the at least one integrator having gain and bandwidth characteristics associated therewith;

adjusting at least one of gain and bandwidth of the at least one integrator based on the intensity profile; and injecting onto the receiver transmission line a synthesized cancellation signal corresponding to the cancellation signals generated by the signal controllers of the adaptive interference canceller circuits, the synthesized cancellation signal injected onto the receiver transmission line being substantially equal in amplitude and substantially opposite in phase to the multiple time delayed components of the multi-path interference signal received by the receive antenna and carried on the receiver transmission line to minimize or cancel the multiple time delayed components of the multi-path interference signal on the receiver transmission line.

* * * * *